C. WERNER.
SIFTER.
APPLICATION FILED SEPT. 19, 1921.
1,416,145.
Patented May 16, 1922.
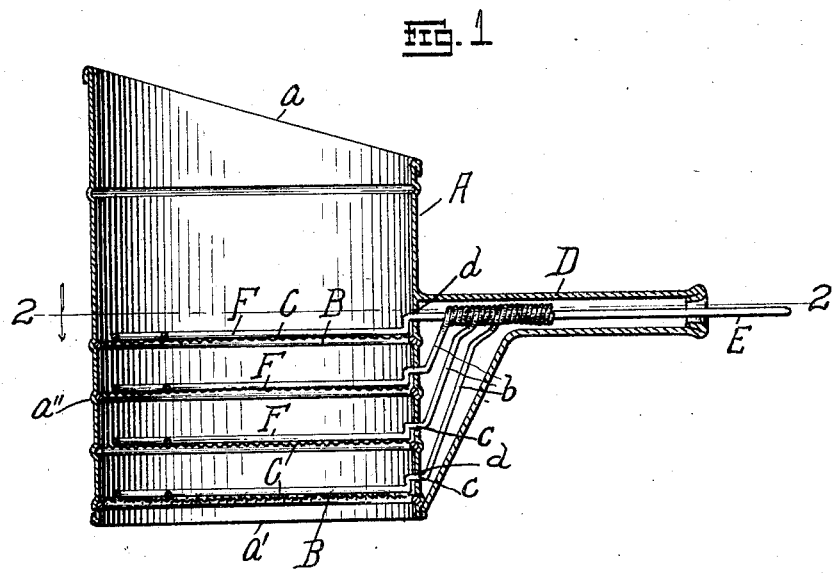
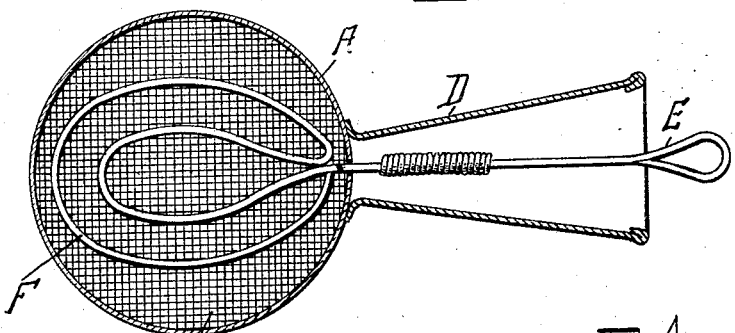
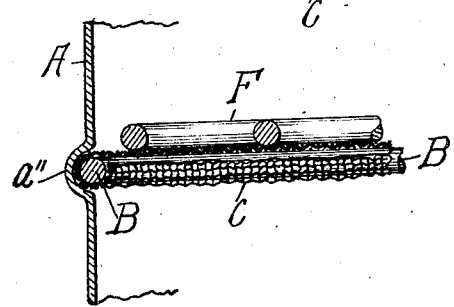
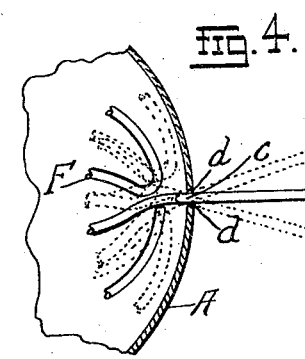
Inventor
Carrie Werner.

UNITED STATES PATENT OFFICE.

CARRIE WERNER, OF ST. LOUIS, MISSOURI.

SIFTER.

1,416,145. Specification of Letters Patent. Patented May 16, 1922.

Application filed September 19, 1921. Serial No. 501,641.

*To all whom it may concern:*

Be it known that I, CARRIE WERNER, a citizen of the United States, and resident of St. Louis, Missouri, have invented certain new and useful Improvements in Sifters, of which the following is a specification.

This invention relates to improvements in sifters and has for its object a plurality of screens or bolting surfaces spaced at intervals apart and agitators above the same by which the material is sifted a plurality of times by one operation.

The essential object of my invention is to sift the material at least four times by a simultaneous action of the agitators as the material passes through the sifter, thus dispensing with the old process of replacing the sifted material back into the sifter for repeating the operation.

By my construction the material such as flour when placed in the sifter, permits the flour to pass from one screen to the next and so on until it has made its circuit, thus the same flour is sifted four times by one operation.

The device is simple in construction and the sifting is done by manipulating a plurality of agitators simultaneously by one handle and in a sidewise motion.

Figure 1, is a central vertical sectional view of my invention.

Fig. 2, is a horizontal sectional view taken on the line 2—2 of Fig. 1.

Fig. 3, is an enlarged detail sectional view of a portion of the container, agitator and sifting material.

Fig. 4, is an enlarged detail sectional view showing the position of the agitator and its pivot point.

In the construction of my invention I provide a container (A) consisting preferably of a tubular body having an open slanted top ($a$) and an open bottom ($a'$), the wall of the body being beaded at suitable intervals as that indicated by the letter ($a''$).

These beads are spaced a reasonable distance apart and in the hollow thereof is inserted a ring (B) of some springy material and split so as to permit the ring to be compressed when inserting the same in the bead and to expand when so seated in order to retain itself in set position.

On these rings is placed a screen (C) or sheet of bolting material through which the flour is to pass during the sifting process.

To one side and attached to the body is a handle (D) the same being somewhat flattened as shown in Fig. 2, and in which is supported a sifting handle (E) from this handle diverges a plurality of stems ($b$) all being suitably bent forming a slight horizontal portion ($c$) which pass through openings ($d$) formed in the body, and which openings act as a bearing for each stem so as to impart a side horizontal motion to the agitators (F) formed by bending the unattached ends of the stems ($b$) into loops.

These agitators are preferably shaped as shown and are arranged to approximately rest on the screen or bolting material.

By my arrangement all of the agitators are connected to one handle and by a side movement imparted on the handle (E) all of the agitators are simultaneously operated.

In many instances when baking certain pastry, the recipe calls for sifting the flour four times, to do this under ordinary circumstances the flour is sifted, then placed back in the sifter and sifted again, and so repeated until the flour has been passed through four times, by my improved sifter the flour passes through four sieves and spaces at one operation, thus when the flour is placed in the receptacle it is sifted four times before it passes out at the bottom.

Having fully described my invention what I claim is:

1. A sifter comprising a container a hollow handle connected thereto, a plurality of sieves located therein and spaced at intervals apart, an agitator located on the top of each sieve, said agitators all being connected to a single handle passing through and operating in said hollow handle for manipulating said agitators simultaneously, substantially as specified.

2. A sieve of the character described comprising a tubular casing having an open top and bottom, screens located in said tubular casing and spaced at intervals apart, agitators located above each screen and having bearing in holes formed in the casing, a hollow handle attached to the casing and a handle connected to each of the agitators and passing through the hollow handle so as to impart motion to the agitators simultaneously, substantially as specified.

3. A sieve of the character described comprising a casing having an open top and bottom a hollow handle extending from said casing, sieves located in said casing and spaced at suitable intervals apart, said sieves arranged to be detached from the container when necessary, an agitator located above each of the sieves and a handle positioned in the hollow handle for operating each of the agitators simultaneously for sifting the material a plurality of times during one operation.

In testimony whereof, I have signed my name to this specification, in presence of two subscribing witnesses.

CARRIE WERNER.

Witnesses:
 ALFRED A. EICKS,
 B. M. MANN.